(No Model.)

T. T. MORROW.
SNAP HOOK.

No. 412,112.  Patented Oct. 1, 1889.

WITNESSES:
Fred G. Dieterich
P. B. Turpin.

INVENTOR.
Thomas T. Morrow.
BY Munn & Co.
ATTORNEY.

UNITED STATES PATENT OFFICE.

THOMAS T. MORROW, OF CARO, MICHIGAN.

SNAP-HOOK.

SPECIFICATION forming part of Letters Patent No. 412,112, dated October 1, 1889.

Application filed May 14, 1889. Serial No. 310,708. (No model.)

*To all whom it may concern:*

Be it known that I, THOMAS T. MORROW, of Caro, in the county of Tuscola and State of Michigan, have invented a new and useful Improvement in Snap-Hooks, of which the following is a specification.

My invention is an improvement in hooks for use on whiffletrees, vehicle-tongues, chains, and in other arrangement wherein the use of such hooks may be desirable; and the invention consists in the novel construction and combinations of parts, as will be hereinafter described, and pointed out in the claim.

Figure 1:
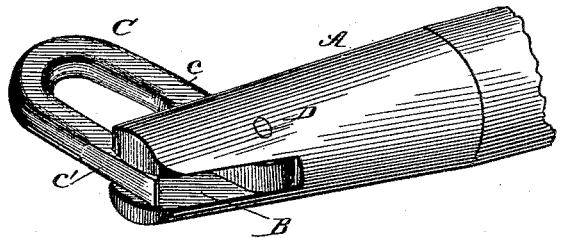
Figure 2:
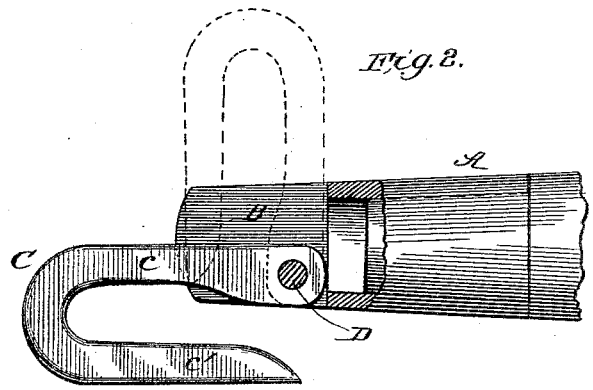

In the drawings, Figure 1 is a perspective view of my invention with the hook in closed position; and Fig. 2 is a plan view of same partly broken away, with the hook open in full lines and closed in dotted lines.

The support A for the hook is preferably made in the shape of a ferrule socketed at one end to facilitate its application to a whiffletree vehicle-tongue or other carrying construction. At its outer end the support or ferrule is slotted at B to receive the hook C, which is pivoted at one end in the said slot, as shown, and will be more fully described. This hook C is made approximately U shape, with the width between its arms not exceeding the depth of slot B, so that when the hook is pivoted in said slot its open end will in the closed position of such hook be closed by the support.

The hook may be said to have a shank-arm *c* and a point-arm *c'*, the end of such shank-arm being pivoted at D, within the slot B, and at the base of the latter, so that when turned to position for use or closed position the shank-arm will bear against the inner wall of the slot B and be steadied in place. When turned to position for use, it will be seen that the point of the hook also rests in the slot B, and the opening of such hook is consequently closed, so that a ring or other object engaged therewith will be held in such engagement. Now it will be seen that the hook may be turned outward to a point at about right angles to its closed position, when its shank will rest about in line with the length of the ferrule. This position of the hook is shown in full lines in Fig. 2, and it will be seen that in such position a chain-link, ring, or other construction can be freely moved into and out of engagement with the hook.

It will be seen that the draft on the hook in the use of the device is in the direction of the arrow indicated in Fig. 2, and such strain operates positively to hold the hook in closed position, and it can only be adjusted out of such position by releasing such strain, when, by turning the hook back, so that its point escapes from the slot B, the ring or other object engaged therewith can be removed.

The construction is strong, simple, and easily operated, and certain and secure in use.

Having thus described my invention, what I claim as new is—

The improvement in hooks, substantially as described and shown, consisting of the ferrule or support having one end socketed to fit a whiffletree or the like and provided at its other end with a slot B, the inner wall of which is formed to provide a stop for the shank-arm of the hook proper and the hook proper having a shank-arm *c* and a point-arm *c'*, the said shank-arm *c* being pivoted at or near its extremity to the ferrule or support at a point near the rear edge of the ferrule and close to the inner stop-wall of the slot, whereby, when the hook is closed, its shank-arm will bear against said stop-arm, and when open said arm will rest with its inner side approximately flush with the rear edge of the support, thereby leaving the opening to said hook unobstructed, substantially as and for the purpose set forth.

THOMAS T. MORROW.

Witnesses:
 EDWARD GOODCHILD,
 PETER P. DAWSON.